United States Patent [19]

Moore et al.

[11] Patent Number: 4,883,846

[45] Date of Patent: Nov. 28, 1989

[54] ANIONIC POLYMERIZATION OF PURIFIED MONOVINYLIDENE AROMATIC MONOMER FEED STOCK

[75] Inventors: Eugene R. Moore; Brian D. Dalke; Michael T. Malanga; Gary M. Poindexter, all of Midland, Mich.

[73] Assignee: The Dow Chemical Company, Midland, Mich.

[21] Appl. No.: 40,508

[22] Filed: Apr. 20, 1987

[51] Int. Cl.[4] ............ C08F 2/06; C08F 4/48; C08F 6/10

[52] U.S. Cl. .................. 526/73; 526/77; 526/173; 526/346; 526/347; 528/501; 585/251

[58] Field of Search ........... 526/73, 77, 173, 346, 526/347; 528/503, 501; 585/266, 806, 251

[56] References Cited

U.S. PATENT DOCUMENTS

| | | | |
|---|---|---|---|
| 3,030,346 | 4/1962 | Cooper | 526/173 X |
| 3,031,432 | 4/1962 | Kern | 526/173 X |
| 3,041,312 | 6/1962 | Boyd | 526/346 X |
| 3,268,501 | 8/1966 | Crouch et al. | 528/503 X |
| 3,402,160 | 9/1968 | Hayes | 526/173 X |
| 3,488,332 | 1/1970 | Hiraoka et al. | 526/173 X |
| 3,786,116 | 1/1974 | Milkovich et al. | 526/173 X |
| 3,812,088 | 5/1974 | Bennett | 526/173 X |
| 3,842,050 | 10/1974 | Milkovich et al. | 526/173 X |
| 3,842,057 | 10/1974 | Milkovich et al. | 526/173 X |
| 3,842,058 | 10/1974 | Milkovich et al. | 527/173 X |
| 3,842,059 | 10/1974 | Milkovich et al. | 526/173 X |
| 3,846,393 | 11/1974 | Milkovich et al. | 526/173 X |
| 3,862,098 | 1/1975 | Milkovich et al. | 526/173 X |
| 3,862,101 | 1/1975 | Milkovich et al. | 526/173 X |
| 3,862,102 | 1/1975 | Milkovich et al. | 526/173 X |
| 4,748,222 | 5/1988 | Malanga | 526/173 X |

FOREIGN PATENT DOCUMENTS

0087165 8/1983 European Pat. Off. ........ 526/346 X

OTHER PUBLICATIONS

Wenger et al., A Simple Process for Controlled Anionic Polymerization, Makromol. Chemie, 43, 1, 1961.
Kamienski, Lithium Catalysis in Industrial Polymerization, Ind. and Eng'ing Chem., 57(1), 38–55 (1965).
Moore, Gel Permeation Chromatography. I. A New Method for Molecular Weight Distribution of High Polymers, J. of Polym. Sci., Pt. A, 2, 835–43 (1964).
"The Effect of Molecular Weight Distribution on the Physical Properties of Polystyrene", McCormick et al., *Journal of Polymer Science*, vol. XXXIX, pp. 87–100 (1959).
"Comparison of Some Mechanical and Flow Properties of Linear and Tetrachain Branched Monodisperse Polystyrenes", Wyman et al., published in *Journal of Polymer Science*, Part A, vol. 3, pp. 681–696 (1965).
"Eigenschaftskennfunktionen Thermisch Hergestellt Polystyrole Unterschiedlichen Molekulargewicht und Unterschiedlicher Molekulargewichtsverteilu", published May 16, 1969.
"Carbanions, Living Polymers and Electron Transfer Processes", by M. Szwarc, published by *Interscience*, 1968, pp. 27–37.
*Journal of the American Chemical Society*, vol. 78, paragraph 2656 (1956), by M. Szwarc et al.

Primary Examiner—Joseph L. Schofer
Assistant Examiner—F. M. Teskin
Attorney, Agent, or Firm—Price, Heneveld, Cooper, Dewitt & Litton

[57] ABSTRACT

The specification discloses a monovinylidene aromatic polymer having a molecular weight of at least 50,000 and an extremely narrow molecular weight distribution of less than 1.5, preferably with at least 80% by weight of the polymer having a molecular weight within plus or minus 30% of the weight average molecular weight. This polymer is produced through anionic polymerization of a pure feed stock which is first cooled to a temperature at which an anionic initiator preferentially reacts with impurities present in the feed stock and initiates the polymerization reaction but does not substantially propagate styrene polymerization. The initiator is uniformly dispersed into the feed stock while maintaining it at the lower temperature and the feed stock temperature is subsequently increased to a temperature at which polymerization of the sytrene proceeds normally. The resulting polymer is especially well adapted to injection molding in that exceptional strength properties are achieved in combination with good processability, e.g., melt flow rate.

20 Claims, 4 Drawing Sheets

ANIONIC POLYMERIZATION OF PURIFIED MONOVINYLIDENE AROMATIC MONOMER FEED STOCK

BACKGROUND OF THE INVENTION

The present invention relates to monovinylidene aromatic polymers, such as polystyrene, and plastic molding compositions based thereon. An important problem encountered with such polymers involves trying to maximize toughness and resistance to heat distortion while at the same time maximizing processability, usually assessed in terms of melt flow rate. Typically, processability, i.e., melt flow rate, is increased through the use of plasticizers such as mineral oil. The problem with adding plasticizers is that they lower heat distortion resistance, flexural and tensile strength. In addition to creating usage problems for any product molded from such compositions, they also require increased mold cycle times in order to prevent post molding heat distortion. The part must be cooled down to a lower degree before being removed from the mold.

In an article entitled "The Effect of Molecular Weight Distribution on the Physical Properties of Polystyrene," *Journal of Polymer Science*, Volume XXXIX, pages 87–100 (1959), Herbert W. McCormick, Frank M. Brower and Leo Kin suggest that a narrowing of the molecular weight distribution should lead to higher physical properties in relation to the melt viscosity or ease of fabrication of the plastic composition. However after testing this theory, they report that:

"The lowering of the property at a given number average weight and the increase in high shear viscosity at a given weight average molecular weight with increasing narrowness of the molecular weight distribution indicate little or no merit in the idea of obtaining comparable physical properties with greater ease of fabrication for polystyrene of narrow molecular weight distribution."

The results observed by McCormick et al. have been confirmed in other literature.

It has been recognized that the anionic polymerization of styrene does enable one to control molecular weight and molecular weight distribution more closely. Very small quantities of such materials are sold for calibrating molecular weight determination instruments. However, anionic polymerization has not been used to produce polystyrene commercially. It is generally believed that the resulting polystyrene does not afford good melt flow rate for a given set of strength properties. Further, commercial scale anionic polymerization results in undesirable end product discoloration.

SUMMARY OF THE INVENTION

In the present invention, it has been surprisingly found that exceptional toughness and exceptional resistance to heat distortion can be combined with good melt flow rate in an anionically prepared monovinylidene aromatic polymers having a weight average molecular weight greater than 50,000 and a molecular weight distribution (weight average molecular weight divided by number average molecular weight) of 1.5 or less (most preferably less than 1.2) wherein the total dimer and trimer content is less than 1000 parts per million and the residual monomer level is less than 200 parts per million. Preferably, 85% of the polymer by weight is within plus or minus 30% of the weight average molecular weight.

Such a polymer ca be produced by adding the entire amount of desired initiator to a substantially pure monomer and solvent feed stock at a temperature less than approximately 25 Degrees C. After any impurities in the system have reacted with the initiator, and after initiation has been completed, the temperature of the reaction system is increased to begin polymer propagation.

The product of the present invention is particularly suited for injection molding. This is particularly true where the molecular weight is within the preferred range of 100,000 to 250,000 weight average molecular weight. High flex strength, good heat distortion resistance and good processability, i.e., melt flow rate, are achieved with the polymers of the present invention.

These and other aspects, features and advantages of the invention will be more fully understood and appreciated by reference to the complete specification and claims.

DESCRIPTION OF THE PREFERRED EMBODIMENT

Narrow Molecular Weight Polystyrene

Figure 1:
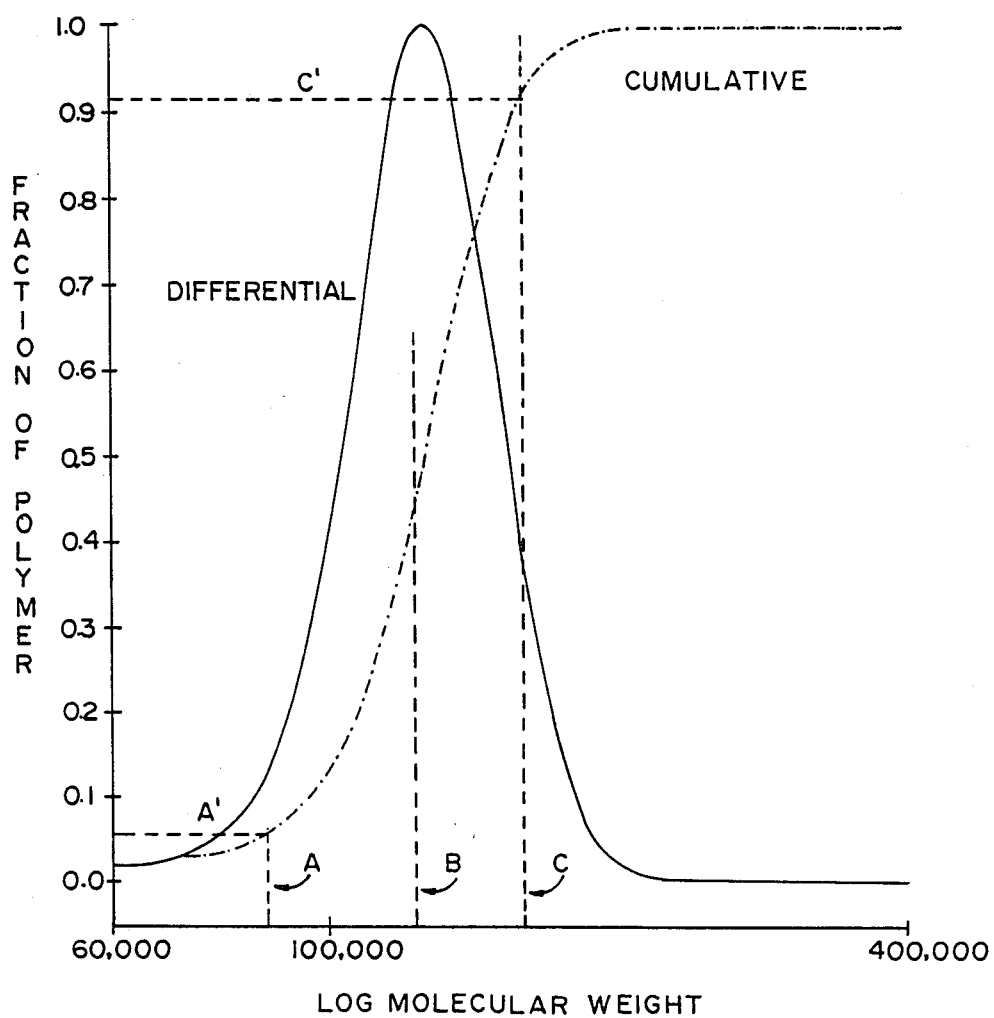
FIG. 1 shows cumulative and differential molecular weight distribution curves for a polystyrene of the present invention.

In one preferred embodiment, polystyrene in accordance with the present invention is anionically prepared and has a weight average molecular weight greater than about 50,000, preferably within the range from about 100,000 to about 250,000. The molecular weight distribution, i.e., the weight average molecular weight divided by the number average molecular weight, is less than 1.5 and most preferably less than 1.2 as determined by gel permeation chromatography. Impurity content is very low, with total dimer and trimer content being less than 1000 parts per million and the residual monomer level being less than 200 parts per million. Preferably, at least 85% by weight of the product should have a molecular weight within plus or minus 30% of the weight average molecular weight. Most preferably, more than 90% by weight of the product should fall within that range.

In comparing the flex strength, tensile strength and melt flow rate data obtained using the polystyrenes of the present invention (see Table I) with comparable results published in prior art literature (as for example as reflected in Table II), the polystyrenes of the present invention showed consistently superior physical properties at a given weight average molecular weight and melt flow rate. Yet, the prior art polystyrenes reported in the literature allegedly have molecular weight distributions of less than 1.5 and are often anionically prepared. It is difficult to explain the reasons for this superiority. However in hindsight, we believe that the unexpected superiority of the polystyrene of the present invention may be based on one or more of the following facts:

1. In the past, molecular weight distribution has been determined using unreliable ultracentrifuge techniques. The molecular weight distributions for the polystyrenes of the present invention were determined using the far more accurate gel permeation chromatography technique.

2. The polystyrenes of the present invention have been made using a different, carefully controlled batch process, especially adapted in the preferred embodiment for commercial operation with productivity comparable to a continuous process.

3. Impurity levels are carefully controlled.

All molecular weight distributions were measured using gel permeation chromatography. Gel permeation chromatography (GPC) is a mechanical separation of polymer molecules based on their size in solution. Separation is achieved by repeated exchange of the solute molecules between the bulk solvent of the mobile phase and the stagnant liquid phase within the pores of the packing. The pore size of the packing determines the molecular size range within which separation occurs. The smallest components of the molecular weight distribution migrate into the smallest pores of the column packing. Large molecules are excluded from some of the pores. For small molecules, the path through the column is more tortuous than for larger ones. Thus the polymer molecules are separated by hydrodynamic volume with the largest molecules eluting first and the smallest ones eluting last.

The integrity of GPC data depends on many important characteristics of the instrumentation, data reduction system, and chromatography. These characteristics include a pump that delivers the mobile phase at a very constant flow rate, a detector with a good signal to noise ratio, columns that have a calibration curve where the logarithm of molecular weight is linear with retention volume for the range of molecular weights being analyzed, columns that have good peak symmetry values and low peak broadening, room temperatures that are constant, polymer solutions concentrations that are constant, proper calibration, and proper selection of the portion of the chromatogram to be used in the calculations.

In order to achieve the product of the present invention, it is important that certain extraordinary steps be taken during the anionic polymerization process. First, the styrene monomer feed stock must be treated so as to be exceptionally pure. It is important that reactive gases such as carbon dioxide and oxygen be removed from the feed stock. This can be accomplished in different ways, as for example by bubbling dry nitrogen through the feed stock monomer solution. Another procedure involves heating then spraying the feed stock into a vacuum chamber. Then, the feed stock is passed over activated alumina. On a production scale, phenylacetylene should also be removed in order to prevent discoloration in the final product.

Figure 5:
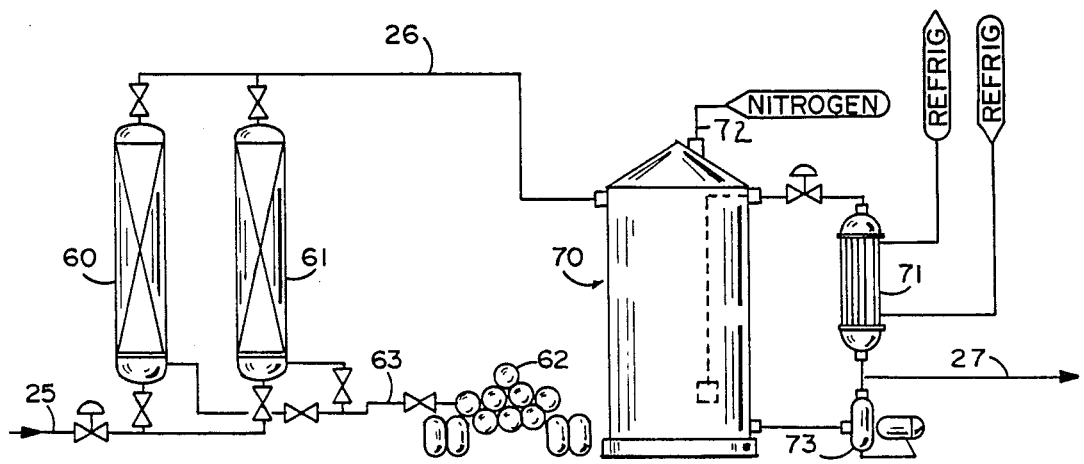
FIG. 5 illustrates equipment and a method for hydrogenating residual phenylacetylene in the monomer.
Figure 4:
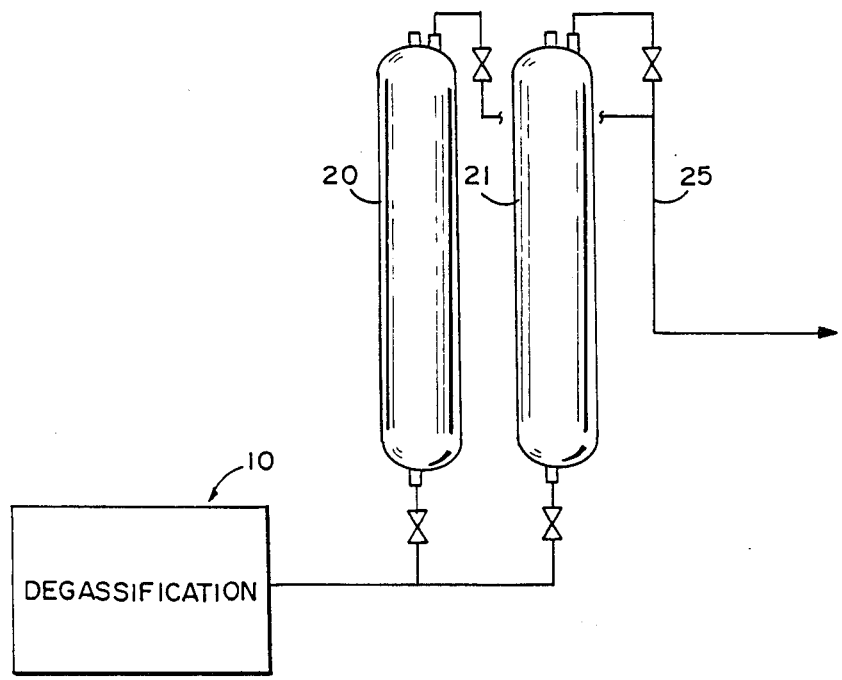
FIG. 4 illustrates the monomer degassification and alumina bed treatment of the present invention.

The process for pretreating the styrene monomer feed stock is illustrated more specifically in FIGS. 4 and 5. After degassification at 10 (FIG. 4) by one of the standard procedures described above, the monomer feed stock is fed through feed line 11 into the bottom of one of two activated alumina beds 20 and 21. Alternative beds 20 and 1 are provided so that the feed stock can be fed through one bed while the other bed is being regenerated.

After monomer passes through either alumina bed 20 or 21, it exits the alumina beds via line 25 and passes through either hydrogenator 60 or 61 (FIG. 5). Each hydrogenator is two to four feet in diameter, 16 feet long and is packed with copper catalysts. Hydrogen is fed into hydrogenators 60 and 61 from hydrogen feed tanks 62 via feed line 63. Residual phenylacetylene is thus reduced to styrene monomer, surprisingly thereby eliminating a later discoloration problem. Monomer exiting hydrogenator 60 or 61 through the top passes via feed line 26 into a large 10,000 gallon tank 70. The feed stock is recirculated from tank 70 through a cooling heat exchanger 71 while tank 70 is kept under a flow of nitrogen via nitrogen feed line 72. Recirculation is effected by pump 73. Heat exchanger 71 cools the monomer feed stock to a temperature less than about 25 Degrees C. and most preferably less than 20 Degrees C. for reasons explained below in relation to the introduction of monomer and initiator into the reactor 80.

Figure 6:
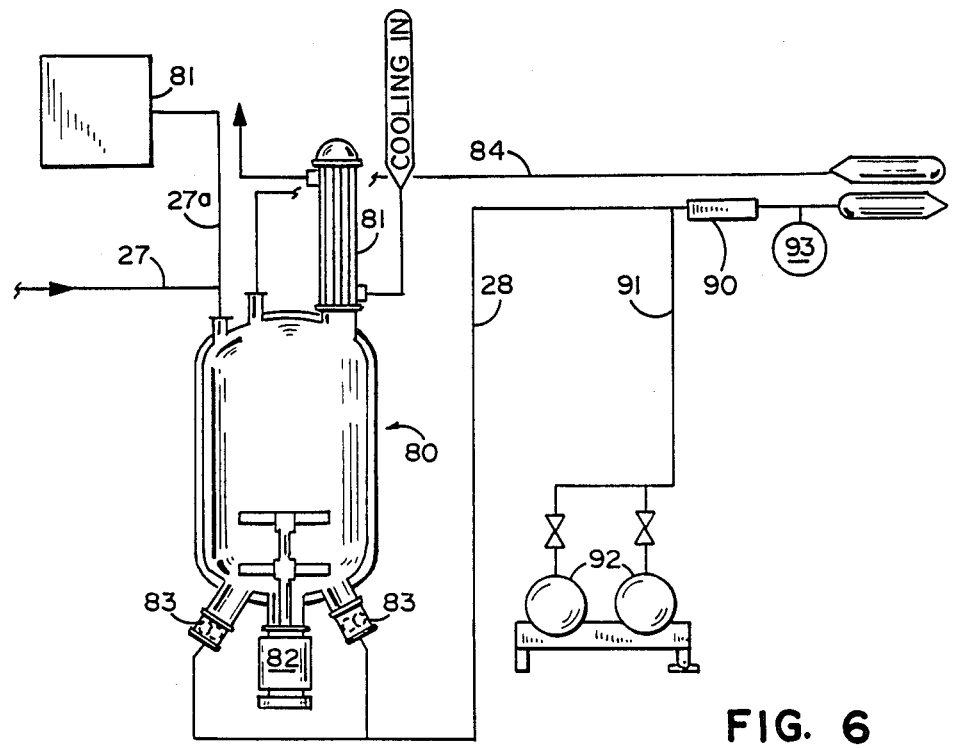
FIG. 6 illustrates the reactor and terminator.

As needed, feed stock is drawn off through line 27 and is fed into a very clean reactor 80 (FIG. 6). The monomer is diluted and mixed with a suitable solvent, such as ethylbenzene, introduced through feed line 84. In terms of controlling the reaction, it is helpful to use a styrene solution rather than pure styrene monomer. The presence of the solvent, as for example ethylbenzene, helps to dissipate any heat generated and thereby helps prevent the reaction from proceeding erratically. The percentage of monomer in the solution is a function of the effectiveness of the reactor cooling jacket. We have worked with 30% styrene solutions, but believe that solutions as high as about 60% styrene could be controlled with conventional cooling equipment. 20 to 35% monomer solutions are preferred, since little or no external cooling is required devolatilization requirements become excessive. Concentration of the polymer to 60% solids becomes impractical. Reactor 80 is fitted with a condenser 81, mixing motor 82 and a pair of polymer pumps 83.

It is important that the entire feed stock, i.e., monomer and solvent, be introduced into the reaction vessel initially, prior to initiator addition. It is of critical importance that, prior to initiator addition, the styrene monomer feed stock be cooled by cooling heat exchanger 71 to a temperature at which the initiator reacts with an impurities, and generally uniformly initiates the polymerization without substantial propagation of polystyrene polymerization. At such temperatures, the styrene does not, for all practical purposes, polymerize. Any polymerization is extremely slow and takes place only after the initiator has reacted with impurities present. The monomer solution should be cooled to a temperature less than about 25 Degrees C. Most preferably, the styrene should be chilled to less than 20 Degrees C. It should be maintained at this temperature during the addition of all of the initiator.

This accomplishes two things. First, it enables the initiator to react with any impurities in the system without simultaneously effecting the polymerization of the styrene. In other words, inadvertent chain termination is prevented. Secondly, by having all of the initiator in the solution prior to elevating the temperature above 25

Degrees C. one insures that the styrene monomer will polymerize uniformly.

Initiator, such as normal butyllithium, is introduced from source 81 through line 27a into reactor 80. It is important that the initiator be uniformly dispersed in the feed stock prior to elevating the temperature of the feed stock. This insures that the initiator has had an opportunity to react with all impurities present. That reaction is essentially instantaneous, once the impurities have been exposed to the initiator. It also insures that initiation, i.e., the reaction of a molecule of initiator with a molecule of styrene, will be complete prior to propagation beginning. This insures that polystyrene chains will propagate uniformly and be of relatively uniform molecular weight.

As long as all of the initiator is added while the monomer is cooler than 25 Degrees C., the method of addition is not critical. One can initially add a little initiator to react with impurities, and then add an amount necessary to achieve a desired molecular weight polystyrene. A delay between addition of a purifying amount of initiator and an amount to effect chain initiation and propagation is acceptable. However, the propagating amount of initiator should be added over a short period of time and preferably all at once. There is no reason to delay, and certainly excessive delay, which might result in differential propagation in spite of the low temperature, should be avoided. It is preferable that once the purifying amount of initiator has been added, all of the initiator necessary to initiate and propagate chain growth be added all at once. One can simply add all of the initiator at once, including an amount to react with impurities and the calculated amount necessary to give a desired molecular weight.

Once the monomer and anionic initiator are in place and the initiator has had an opportunity to react with any remaining impurities within the system, the temperature of the reaction system is raised to in excess of 25 Degrees C., preferably 35 to 45 Degrees C. and most preferably about 35 Degrees C. Propagation begins and the polymerization reaction then proceeds exothermically. The jacket temperature of the reaction vessel is held at around 35 to 40 Degrees C. Upon completion of the polymerization reaction, the polymer is pumped from the bottom of reactor 80 through line 28 to a static mixer 90 where it is mixed with a terminator, such as methanol, fed through line 91 from methanol tanks 92. A colorimeter 93 positioned downstream from static mixer 90 is used to check for the intense color of the living anion and thereby provides an indicator to insure that termination is complete.

Figure 7:
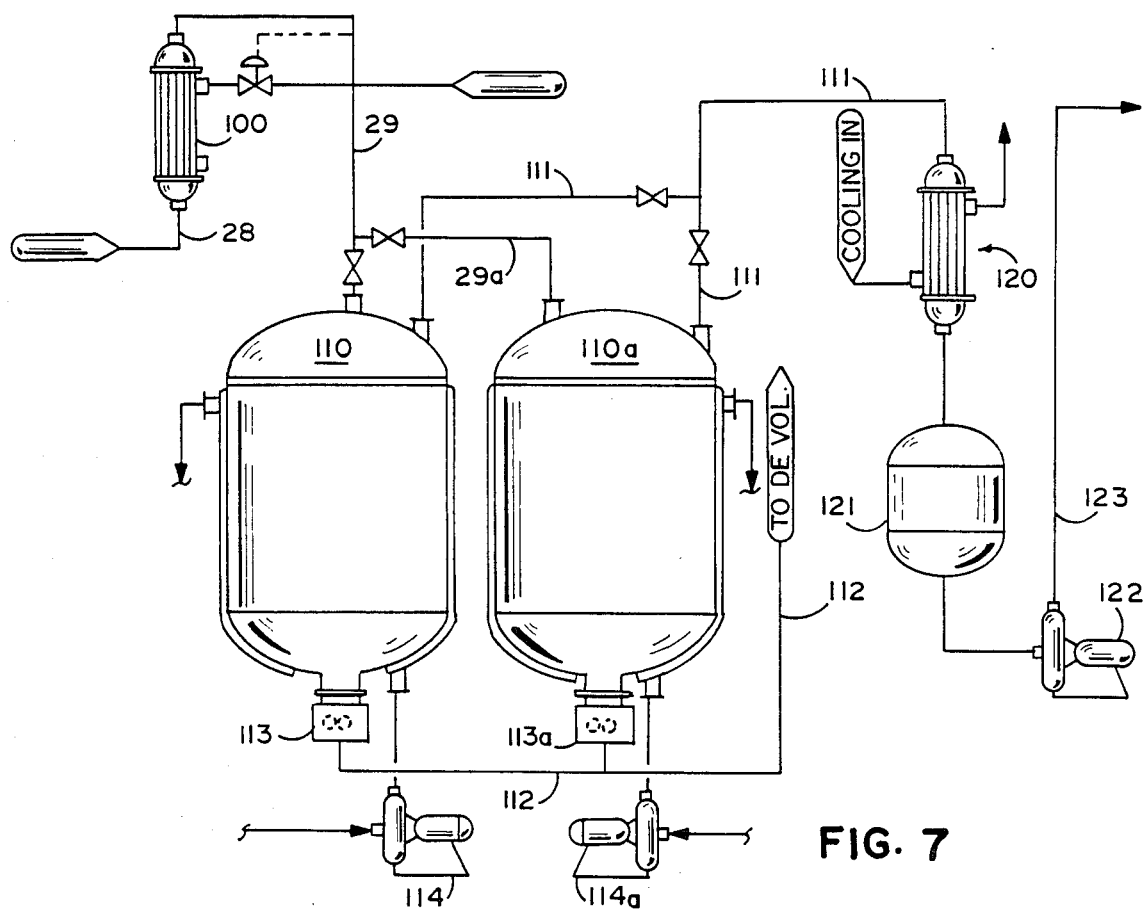
FIG. 7 illustrates the equipment and a method for accumulating batch process polymer for subsequent devolatilization.

From colorimeter 93, line 28 continues to a cooling heat exchanger 100 (FIG. 7). Then via line 29 or 29a, polymer and solvent are fed either into holding or surge tank 110 or 110a for subsequent devolatilization. Vacuum is drawn on tanks 110 and 110a through vacuum lines 111 which lead to condenser 120. Condenser 120 condenses solvent which flows into a solvent tank 121 and from thence is pumped via pump 122 to a holding tank along with other solvent recovered during a standard devolatilization process. Approximately one-half of the solvent is removed in this manner, with the remainder of the devolatilization taking place in standard devolatilization apparatus, where polymer is fed through line 112 either by bottom pump 113 or 113a of tank 110 or 110a respectively. Tanks 110 and 110a are jacketed and are fed by recirculation pumps 114 or 114a respectively with a heated fluid to maintain the polymer at devolatilization temperature. By using two such tanks, one can be predevolatilizing one batch of polymer in one of the tanks while the other batch is being fed to the standard devolatilizer. In this way, a continuous flow of polymer to the devolatilizer is assured, as is the availability of a tank to receive a surge of polymer from reactor 80.

Production control should be maintained such that the quantity of residual monomers and residual low molecular weight impurities in the polystyrene are maintained relatively low. The total dimer and trimer content should be less than 1,000 parts per million and preferably less than 300 parts per million. This compares with a typical prior art polystyrene product which has residual dimers and trimers of 3,000 to 15,000 parts per million.

The residual monomer level should be less than 200 parts per million and preferably less than 100 parts per million. A typical prior art commercial polystyrene would have 300 to 800 parts per million residual monomer.

FIG. 1 shows the differential and cumulative molecular weight distribution curves for a polystyrene produced in accordance with the present invention. The solid bell curve shows the differential molecular weight distribution while the dashed curve shows the cumulative distribution. Vertical line A intersects the cumulative distribution curve at a molecular weight which is 30% less than the weight average molecular weight. Vertical line B intersects the cumulative distribution curve at the weight average molecular weight and vertical line C intersects the cumulative distribution curve at a molecular weight 30% greater than the weight average molecular weight. Horizontal lines A' and C' then extend from the points of intersection of lines A and C and intersect the ordinate at 0.05934 and 0.9166 respectively. The weight average molecular weight for this particular polystyrene is 123,800. 85.7% (91.66 minus 5.93) of the polystyrene falls within a range of plus or minus 30% of the weight average molecular weight. The flexural strength of this particular polystyrene is 7700 psi and the tensile strength is 5740 psi. The melt flow rate is 14.6 grams per 10 minutes. In all of the experimental work discussed herein, melt flow rate was determined using ASTM D12138, at 200 Degrees C. under a 5 kilogram load.

Figure 2:
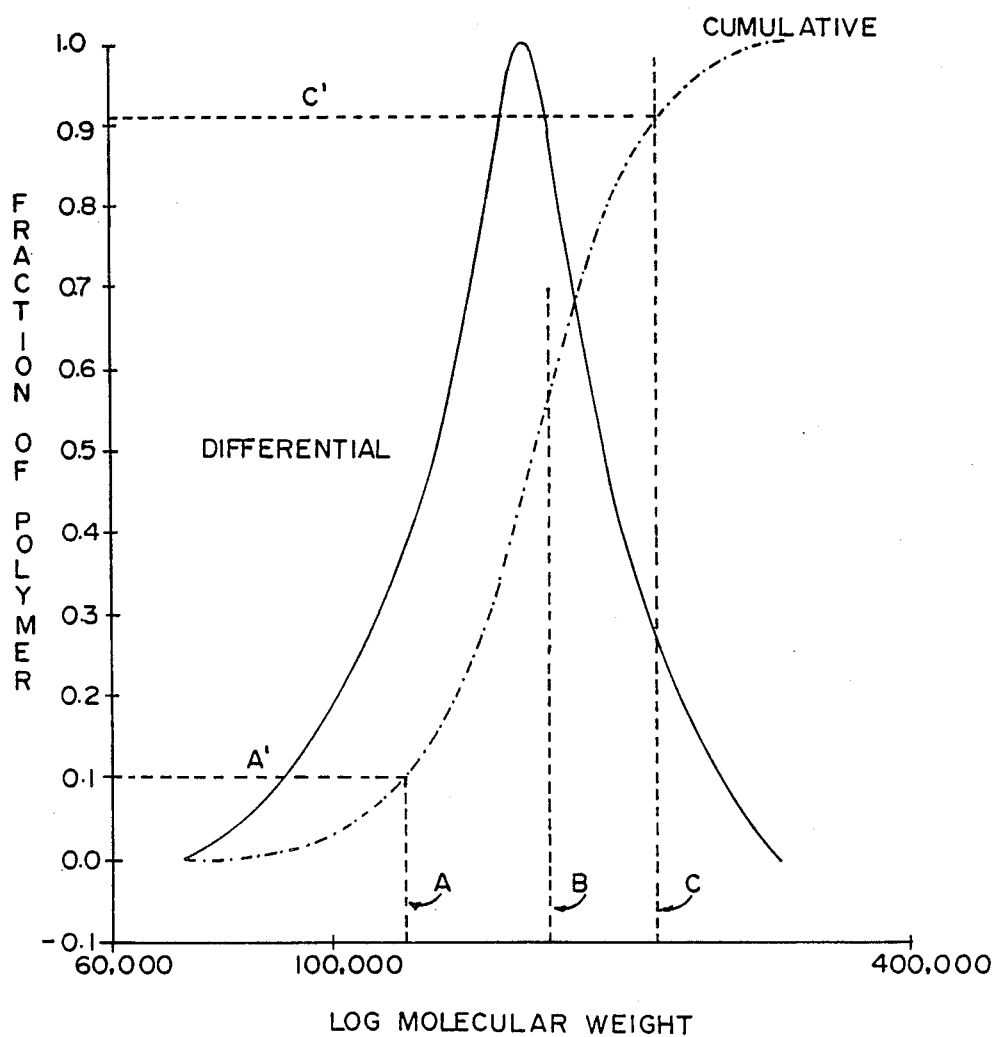
FIG. 2 shows alleged cumulative and differential molecular weight distribution curves for a prior art anionically prepared polystyrene.

FIG. 2 shows the alleged molecular weight distribution curves, vertical lines, horizontal lines and points of intersection for a prior art anionically prepared polystyrene. The curves of FIG. 2 are drawn based on the data shown in FIG. 2 of the McCormick et al. article discussed above. The weight average molecular weight for this polystyrene is 171,000. 10.36% of the resin has a molecular weight below 120,000 (171,000 minus 30% thereof) and 90.44% has a molecular weight below 222,000 (171,000 plus 30% thereof). Thus, only 79% of the prior art anionically prepared resin falls within plus or minus 30% of the weight average molecular weight thereof based on McCormick's own data. Further it is believed that McCormick's molecular weight distribution was actually much broader than he reported and that his erroneous data resulted from the use of inferior molecular weight distribution measuring techniques which were the only techniques available at the time.

Figure 3:
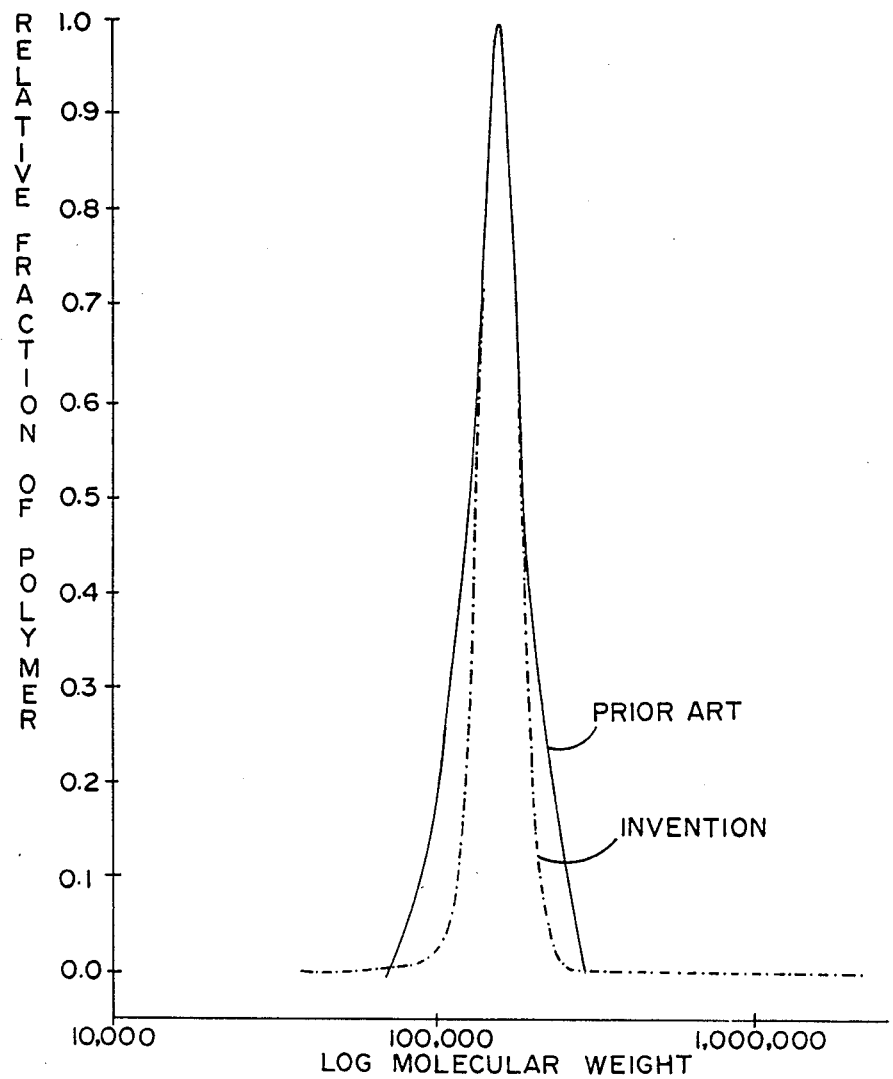
FIG. 3 shows both the differential molecular weight distribution curves of FIGS. 1 and 2 with one shifted so the two can b directly compared.

The difference between the differential and cumulative distributions for the prior art anionically prepared polystyrene and the polystyrene of the present invention can also be seen by reference to FIG. 3, which shows the differential molecular weight distribution curves of FIGS. 1 and 2 shifted so that their peaks coincide. The molecular weight distribution for the polystyrene of the present invention is obviously substantially narrower.

Laboratory Test Run

An experimental test run in accordance with the foregoing anionic polymerization process was conducted in the laboratory as follows:

1. Feed Preparation a. 450 grams styrene and 1050 grams of ethylbenzene were degassed by bubbling for more than two minutes with dry nitrogen. This removed all of the $CO_2$ and $O_2$. Head space gas chromatography is used to assure complete removal of both $CO_2$ and $O_2$.

b. The feed was then purified by passing over about 150 grams of activated Alcoa F-1 alumina (activated by heating to 500 Degrees F. for one hour at 10 mm absolute pressure). The alumina was contained in a column about 1½ inches in diameter and the feed was allowed to flow drop wise through the alumina bed.

2. The Polymerization

Of the above feed, 875 cc (768.25 grams or 2.22 moles of styrene) were added to a very clean one liter, packed glass reactor. The reactor was agitated with a twin turbine agitator driven with an air motor through a mineral oil lubricated, ground glass seal. The reactor was maintained under positive (dry) nitrogen pressure by maintaining a flow through a bubbler submerged into two to three inches of mineral oil. The exiting nitrogen was passed through a water cooled condenser to return any unreacted monomer or solvent.

The contents were lowered to 17 Degrees C. and a 2.5% solution in cyclohexane of n-butyllithium (NBL) was added drop wise until the first color change[1] occurred indicating reduction (to inert moieties) of any remaining impurities. Then a calculated amount of NBL (4.917 grams of a 2.5% solution in cyclohexane or $1.92 \times 10^{-3}$ moles of NBL) was rapidly injected with a syringe (gas tight, Teflon sealed).

[1] The color change referred to is the first, barely visible sign of a pale orange coloration. This indicates the very beginning of a very slow styrene polymerization. As such, it indicates that the initiator has finished reacting with impurities, since at this temperature, styrene will not begin to polymerize until the preferentially reactive impurities have been reacted.

The reactor jacket temperature was raised quickly to 35 Degrees C. where propagation was indicated by an exotherm which caused temperature to increase as follows:

| Time from Shot of NBL | Temperature of Reactor Contents |
| --- | --- |
| 15 min. | 60 Degrees C. |
| 17 min. | 88.4 Degrees C. |
| 25 min | 55 Degrees C. |

Then jacket temperature was held at 40 Degrees C. for an additional 35 minutes and a few drops of methanol were added to terminate the reaction. At this point, the solution changed from a deep red to a colorless solution.

The solution was precipitated by adding it to about four liters of methanol in a large Waring blender which was allowed to mix for about two minutes to provide a filterable crumb. This was then vacuum dried for two hours at 130 Degrees C. then one hour at 170 Degrees C.

Yield was 211 grams (92%) with losses due to "work up" and handling not polymerization.

The calculated molecular weight is:

$$\frac{22.2 \text{ moles sty} \times 104 \text{ gms sty/mole sty}}{1.92 \times 10^{-3} \text{ moles } NBL} = 120,000$$

Measured $M_w$ was 130,000 (Mw/Mn=1.05) which is close to calculated value and unusually narrow. This is primarily due to the unique feed cleanup, blanking technique, and initiation at a temperature low enough to have insignificant propagation during initiation.

Properties of this material were:

| Properties of this material were: | |
| --- | --- |
| MFR (200 Degrees C.; 5 kg) = | 13.0 gms/10 min |
| Tensile Strength = | 5567 psi |
| Tensile Modulus = | 460,000 psi |
| Flex Strength = | 7331 psi |
| Vicat = | 228.6 Degrees F. |

Pilot Plant Production

In the following Examples the process of the present invention was conducted at pilot plant levels:

EXAMPLE 1

A 10,000 gallon stainless steel reactor 80 is thoroughly cleaned (FIG. 6). Reactor 80 is charged with a mixture of 33.3% styrene, 66.7% ethylbenzene. 60,000 pounds of this mixture is chilled to 20 Degrees C. as it is introduced (over a 20 minute period) into the chilled reactor. This feed mixture is previously cleaned by a three stage process of:

1. Degassification 10 (FIG. 4) by heating then spraying into a vacuum chamber, which removes dissolved gases and cools back to ambient temperature;

2. Passing through activated alumina beds 20 and 21 (FIG. 4);

3. Hydrogenation at 60, 61 (FIG. 5) with a selective catalyst for phenylacetylene (PA) until PA content is reduced below 2 ppm.

While at 20 Degrees C., 56.2 pounds of a 15% solution of normal butyllithium (NBL) in cyclohexane is added. The reactor is heated at a rate of about 5 Degrees C. per minute at a temperature of about 35 Degrees C. where a rapid exotherm begins. A total of ten minutes has passed since adding the initiator, the temperature is seen to reach a peak of 133 Degrees C. and then starts to cool.

When one mole of NBL ($M_w=63.9$) is added per 1460 moles of styrene, the molecular weight is 160,000 (versus 152,000 theoretical), showing a very high chain starting efficiency for the NBL. The 60,000 pounds of completely polymerized mixture is then pumped through a mixer (uniformly over a 20 minute period) to which is added a small uniform stream of (4.5 pounds total) methanol ($M_w=32$).

The methanol is a termination agent which also prevents discoloration during the heating required for devolatilization. Immediately after termination, the polymer solution is passed through a heat exchanger into a large 15,000 gallon surge tank (e.g., tank 110 or 110a of FIG. 7). The surge tank is maintained at a reduced pressure equivalent to the boiling point of the solvent in a 50% polystyrene solution. The heat from the heat exchanger and the reduced pressure in the surge tank causes vaporization of half of the solvent (20,000 pounds), increasing the solids content to 50%. Vaporized solvent is condensed and removed in a condenser 120 connected to surge tank 110 or 110a.

This 50% solution is then passed continuously through a two stage devolatilization system comprising a first stage heat exchanger operated at about 430 mm Hg total pressure, and a jacket temperature of 170 Degrees C. The concentrated solution from this first stage is then continuously pumped through a second stage heat exchanger (with a jacket temperature of 250 Degrees C.) into a vacuum chamber maintained at 11 mm Hg absolute pressure. The vacuum is maintained by liquid ring pumps through condensers for the vaporized ethylbenzene, which is recycled after removal of some of the added cyclohexane (which entered with the NBL).

The polymer is pumped through a multi-orifice stranding die into a water bath cooler and then through a cutter. The average polymer collection rate is 11,500 lbs/hr. The product is found to be uniquely low in styrene monomer (less than 10 ppm).

EXAMPLE 2

The process was carried out in a manner similar to Example 1 except the amount of NBL was increased slightly so that the resulting molecular weight was 122,000. The methanol was increased a corresponding amount. The product is found to have a uniquely useful combination of high MFR and high flexural strength.

Product Performance

A number of different molecular weight samples produced in accordance with the foregoing process were compression molded[2] and tested for flex strength and melt flow rate. All of the samples had a cumulative molecular weight distribution such that 85% by weight of the product was within plus or minus 30% of the indicated weight average molecular weight. The total dimers and trimer content of the polymers was less than 300 ppm. The residual monomer level was less than 100 ppm. Melt flow rate was determined at 200 Degrees C. under a 5 kilogram load per 10 minutes. Melt flow rate is in grams per 10 minutes. The results are presented in Table I below:

[2]While the polystyrene of this invention is particularly well suited for injection molding, compression molding was used to make test samples since compression molding eliminates orientation variations induced by injection molding, thereby affording a more accurate basis for comparing to compression molded samples using other polystyrenes, e.g., as is reported in McCormick.

TABLE I

| $M_w$ | MFR | Flex | Tensile | Distribution |
|---|---|---|---|---|
| 85,700 | 42.0 | 4,100 | <3000 | 1.16 |
| 102,000 | 26.0 | 5,100 | <3000 | 1.27 |
| 110,000 | 16.0 | 8,000 | 5870 | 1.07 |
| 123,800 | 14.6 | 7,700 | 5740 | 1.09 |
| 130,000 | 8.0 | 11,000 | 6370 | 1.08 |
| 167,000 | 4.0 | 12,300 | 6470 | 1.10 |
| 200,000 | 2.2 | 12,100 | 6500 | 1.10 |

Table II below shows the tensile strengths reported for compression molded anionically prepared polystyrene samples of the indicated weight average molecular weights in the McCormick article, supra:

TABLE II

| $M_w$ | Tensile Strength |
|---|---|
| 78,000 | 440 |
| 110,000 | 1980 |
| 125,000 | 3000 |
| 141,000 | 4380 |
| 171,000 | 4910 |
| 210,000 | 5150 |
| 249,000 | 4660 |

It can be seen that the tensile strengths obtained by McCormick et al. were significantly lower than those obtained utilizing the polystyrenes made in accordance with the present invention, e.g., compare Tables I and II.

Table III below shows the weight average molecular weight, melt flow rate, flex strength and distribution for a compression molded sample of a particularly exceptional free radical catalyzed polystyrene:

TABLE III

| $M_w$ | MFR | Flex | Distribution |
|---|---|---|---|
| 225,000 | 7.5 | 7500 | 3.2 |

It can be seen that in order to achieve a melt flow rate of 7.5, the producer has to settle for a flex strength of 7500.

In contrast by reference to Table I, it can be seen that the polystyrene of a weight average molecular weight of 130,000 in accordance with the present invention has a melt flow rate of 8 and a flexural strength of 11,000. In other words, comparable processability is achieved in a plastic with significantly higher strength properties.

Narrow Molecular Weight Sams

To illustrate the applicability of the present invention to other monovinylidene aromatic polymers, we anionically produced a very narrow molecular weight styrene alpha methylstyrene copolymer. The process followed is basically the same as that described above, except that alpha methylstyrene acted not only as comonomer, but also as the solvent for the reaction. Also, once the reaction was initiated at 20 Degrees C., the reactants were rapidly heated to in excess of 60 Degrees C. to insure that the majority of the polymerization occurred at a temperature above 60 Degrees C., and preferably between about 60 and 120 Degrees C.

The concept of anionically polymerizing styrene alpha methylstyrene at above 60 Degrees C. is in European Patent Application No. 087165 published Aug. 31, 1983. In this way, no more than two alpha methylstyrene units will be added to the polymer chain sequentially, since above 60 Degrees C. the rate of depolymerization for the AMS monomer is greater than the rate of polymerization. Since the polymerization of the styrene monomer is not affected at these temperatures (ceiling temperature greater than 300 Degrees C.), the copolymerization proceeds smoothly.

Sufficient alpha methylstyrene is used to serve as a solvent for the styrene, and to result in a copolymer containing 20 to 35% alpha methylstyrene by weight. The weight average molecular weight can be varied from 50,000, preferably 100,000, to 200,000 and the molecular weight distribution from about 1.0 to about 1.5. The most preferred high flow product would have a molecular weight of 120,000 to 140,000 with a molecular weight distribution of 1.1.

The resulting narrow molecular weight distribution styrene alpha methylstyrene copolymer is described by the formula:

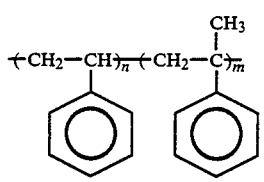

where n is proportioned to result in 65-80% by weight polystyrene and m is proportioned to result in 20-35% by weight alpha methylstyrene.

SAMS EXAMPLE

A mixture of 126 grams of styrene monomer and 477 grams of alpha methylstyrene monomer was thoroughly degassed by sparging nitrogen through it. This mixture was charged to a clean, dry reactor under nitrogen atmosphere (on a commercial scale, the mixture would first be passed through an alumina bed to eliminate further impurities and subjected to hydrogenation as described above to eliminate residual phenylacetylene). The reactor and contents were cooled to about 20 Degrees C. with agitation. The entire amount of 7.24 grams of a 2.1% by weight solution of normal butyllithium in cyclohexane was added to the reaction mixture. Approximately 3.8 grams of this solution was consumed by impurities in the monomer mixture and the remainder initiated polymerization of the copolymer. The temperature of the solution was then quickly raised to 115 Degrees C. by applying heat to the reactor jacket. The heat of polymerization carried the temperature of the mixture higher during its exotherm. The majority of the polymerization occurred between 350 and 450 seconds.

After about 10½ minutes, several drops of methanol were added to the reactor to terminate the polymerization. The solids content of the reaction mixture after polymerization was about 29%. The resulting product was 28% alpha methylstyrene and 72% styrene.

The copolymer was devolatilized by vacuum and heat to remove all residual alpha methylstyrene. The molecular weight of the final copolymer was measured by gel permeation chromatography. The weight average molecular weight was determined to be 137,000 and the number average molecular weight was 123,000, giving a molecular weight distribution A number of samples were prepared in accordance with the foregoing procedures. The melt flow rates, flex strengths, vicat softening temperatures and molecular weight distributions for eleven such samples are shown in Table IV

TABLE IV

| SAMPLE # | $M_w$ | MELT FLOW RATE (Cond. I) | FLEX STR (psi) | VICAT (°F.) | DISTRIBUTION |
|---|---|---|---|---|---|
| 1 | 91000 | 42.10 | | | 1.16 |
| 2 | 98000 | 37.50 | 4613 | 249.6 | 1.06 |
| 3 | 54000 | | | | 1.10 |
| 4 | 109000 | 26.70 | 5649 | 249.8 | 1.13 |
| 5 | 194000 | 6.00 | 8342 | 250.2 | 1.16 |
| 6 | 67000 | 115.40 | | | 1.13 |
| 7 | 166000 | 8.90 | 7582 | 250.3 | 1.17 |
| 8 | 137000 | 11.50 | 8385 | 250.6 | 1.12 |
| 9 | 159000 | 7.40 | 8063 | 249.7 | 1.21 |
| 10 | 171000 | 6.50 | 6425 | 250.9 | 1.15 |
| 11 | 109000 | 24.80 | 5491 | 250.6 | 1.14 |

CONCLUSION

In conclusion, the very narrow molecular weight distribution monovinylidene aromatic polymers of the present invention maximize strength properties at a given melt flow rate level. In contrast to prior art teachings, a narrow distribution monovinylidene aromatic polymer does afford significant increases in strength relative to processability.

A significantly narrower distribution monovinylidene aromatic polymer is made possible by the process of the present invention wherein a purified feed stock is totally exposed to the initiator at temperatures below which the initiator preferentially reacts with impurities, in order to eliminate impurities prior to the initiation of styrene polymerization.

The resulting product is particularly well suited for injection molding applications as is indicated by the strength and flow properties set forth above. These polymers are also surprisingly resistant to molecular weight deterioration in processing. Of course, it is understood that the foregoing is merely a preferred embodiment of the invention and that various changes and alterations can be made without departing from the spirit and broader aspects thereof as set forth in the appended claims.

The embodiments of the invention in which an exclusive property or privilege is claimed are defined as follows:

1. A method for anionically polymerizing monovinylidene aromatic monomers comprising:
   purifying a monovinylidene aromatic monomer feed stock by, (1) removing reactive gases from said feed stock, (2) contracting said feed stock from which reactive gases have been removed with activated alumina, and (3) hydrogenating said activated alumina-contacted feed stock;
   cooling said feed stock to a temperature at which an anionic initiator preferentially reacts with impurities remaining in the feed stock and initiates polymerization without substantial propagation of polymerization;
   uniformly dispersing the total quantity of anionic initiator desired into a batch of said feed stock while maintaining said feed stock at said temperature; and
   subsequently increasing the temperature of said feed stock and initiator to a temperature at which polymerization of the monovinylidene aromatic monomer proceeds exothermically.

2. The method of claim 1 in which said feed stock is coded to a temperature below about 25 Degrees C.

3. The method of claim 2 in which said feed stock and initiator are raised to a temperature of between 35 and 45 Degrees C. to initiate exothermic polymerization.

4. The method of claim 3 in which said feedstock comprises a solution of monovinylidene aromatic monomer containing less than 60% monovinylidene aromatic monomer by weight.

5. The method of claim 4 in which said feed stock solution contains between about 20 and about 35% by weight monovinylidene aromatic monomer.

6. The method of claim 5 in which said feed stock solvent comprises ethylbenzene.

7. The method of claim 6 in which said anionic initiator comprises n-butyllithium.

8. The method of claim 1 in which said feed stock is cooled to a temperature of below about 20 Degrees C.

9. The method of claim 8 in which said feed stock and initiator are raised to a temperature of between 35 and 45 Degrees C. to cause polymer propagation.

10. The method of claim 1 in which said feed stock comprises a solution of monovinylidene aromatic monomer containing less than 60% monovinylidene aromatic monomer by weight.

11. The method of claim 10 in which the polymerized monovinylidene aromatic is fed to one of two holding tanks sufficiently large to hold a batch of said polymer; initiating devolatilization of said polymer in said tank; drawing partially devolatilized polymer off said tank and feeding it to further devolatilization means; feeding the next batch of said polymer to the other of said tanks and repeating the above steps whereby as polymer from the first of said tanks is being fed to said further devolatilization means, polymer in said other tank is being initially devolatilized.

12. The method of claim 10 in which said feed stock solution contains between about 20 and about 35% by weight monovinylidene aromatic monomer.

13. The method of claim 13 in which said feed stock solvent comprises ethylbenzene.

14. The method of claim 14 in which said anionic initiator comprises n-butyllithium.

15. The method of claim 15 in which said anionic initiator comprises n-butyllithium.

16. The method of claim 1 in which said monovinylidene aromatic monomer comprises styrene.

17. The method of claim 1 in which said monovinylidene aromatic monomer comprises styrene and an excess of alpha methylstyrene whereby alpha methylstyrene serves as comonomer and solvent.

18. The method of claim 1 in which said monovinylidene aromatic monomer comprises a mixture of styrene monomer and alpha methylstyrene monomer, with alpha methylstyrene monomer being present in substantial excess so as to act as a solvent as well as comonomer; said step of subsequently increasing the temperature of said feed stock and initiator comprising rapidly increasing the temperature to in excess of about 60 Degrees C.

19. The method of claim 18 in which said feed stock is cooled to a temperature below about 25 Degrees C.

20. The method of claim 18 in which said rapidly heating step is conducted so as to elevate the temperature of said feed stock and initiator mixture to a temperature of between about 60 Degrees C. and about 120 Degrees C.

* * * * *

UNITED STATES PATENT AND TRADEMARK OFFICE
CERTIFICATE OF CORRECTION

PATENT NO. : 4,883,846

DATED : November 28, 1989

INVENTOR(S) : Eugene R. Moore, Brian D. Dalke, Michael T. Malanga and Gary M. Poindexter It is certified that error appears in the above-identified patent and that said Letters Patent is hereby corrected as shown below:

Column 2, line 3, "ca" should correctly appear as --can--.

Column 2, line 31, "b" should correctly appear as --be--.

Column 4, line 4, "1" should correctly appear as --21--.

Column 4, line 41, after the word required, insert therefore, --at these levels. Below a 20% monomer level, subsequent--.

Column 4, line 52, "an" should correctly appear as --any--.

Column 8, line 16 of the table, delete "Properties of this material were:".

Column 11, line 50, after the word distribution, insert therefore, --of 1.12--.

Column 12, line 61, "coded" should correctly appear as --cooled--.

Column 14, line 4, "claim 13" should correctly appear as --claim 10--.

Column 14, line 8, "claim 15" should correctly appear as --claim 1--.

Signed and Sealed this

Fifteenth Day of January, 1991

Attest:

HARRY F. MANBECK, JR.

*Attesting Officer*        Commissioner of Patents and Trademarks